W. P. BROOKS.
Draft Equalizer.
No. 78,049. Patented May 19, 1868.
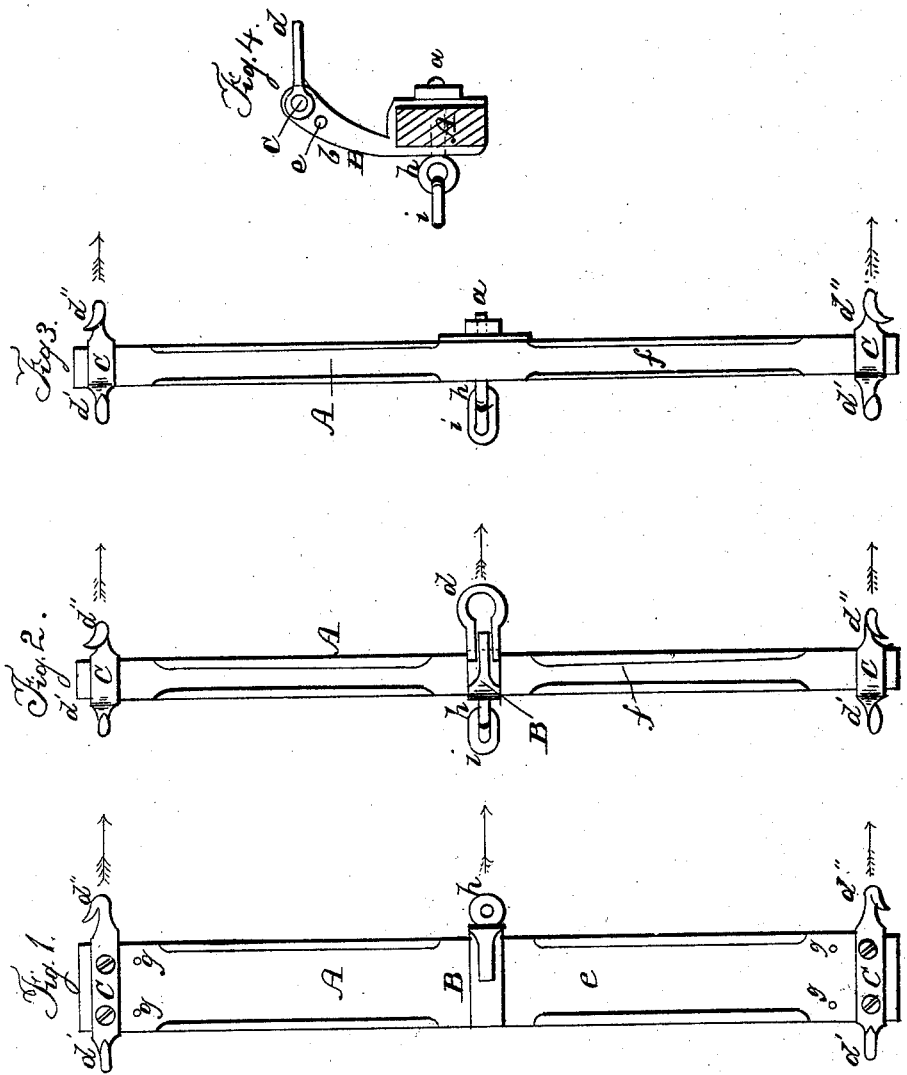
Inventor.
W. P. Brooks
per Munn & Co.
attorneys
Witness
W C Ashkettle
J A Fraser

United States Patent Office.

W. P. BROOKS, OF BLOOMINGTON, ILLINOIS.

Letters Patent No. 78,049, dated May 19, 1868.

IMPROVEMENT IN DRAUGHT-ATTACHMENT FOR VEHICLES.

*The Schedule referred to in these Letters Patent and making part of the same.*

TO ALL WHOM IT MAY CONCERN:

Be it known that I, W. P. BROOKS, of Bloomington, in the county of McLean, and State of Illinois, have invented a new and improved Draught-Attachment or Evener for Vehicles and implements drawn by horses; and I do hereby declare that the following is a description thereof, which will enable others skilled in the art to make and use the same, reference being had to the accompanying drawings forming part of this specification.

This invention relates to a new and improved draught-attachment or evener for vehicles and implements which are drawn by horses, and it consists in a peculiar construction of the device, as hereinafter fully shown and described, whereby the draught may be equally divided between the two or three horses which may be applied to it, or an advantage (ease of draught) allowed either horse, if necessary to do so.

The invention may, by a very simple adjustment of parts, be adapted for either two or three horses, and attached to vehicle or implement, so as to have a flat or edgewise position, as hereinafter fully shown and described.

In the accompanying sheet of drawings—

Figure 1 is a plan or top view of my invention adapted for three horses, and having a flatwise position.

Figure 2, a plan or top view of the same, also adapted for three horses, but having an edgewise position.

Figure 3, a plan or top view of the same, adapted for two horses, and having an edgewise position.

Figure 4, a transverse section of fig. 3, taken in the line $x\ x$.

Similar letters of reference indicate corresponding parts.

A is a wooden bar, of flat form, that is to say, considerably wider than it is thick, and of sufficient length to admit of three whiffle-trees being attached for three horses. To the centre of the bar A there is secured, by a bolt, $a$, an upright wire bar, B, the upper part of which is perforated with a series of holes, $b$, to receive a bolt, $c$, which secures an eye or loop, $d$, to the bar B, said eye or loop being adjusted higher or lower on B, by passing the bolt $c$ through a higher or lower hole, $b$, as will be fully understood by referring to fig. 4. To each end of the bar A, there is secured, by bolts, an iron bar, C. These bars are bent in right-angular form, and provided with hooks $d'\ d''$, at their ends.

These bars C thus bent, are capable of being adjusted to two sides of the bar A, to wit, to one of the broad sides $e$, and to one of the narrow sides or edges $f$. By this means the hooks $d'$ may be at the front edge of the broad side $e$, and the hooks $d''$ at the under side of the same, or considerably below the level or plane of the hooks $d'$.

The bars C may be adjusted nearer to or farther from the centre of the bar A, as desired, different bolt-holes $g$, being made in the bar A, to admit of this being readily done, (see fig. 1.)

The bolt $a$ has an eye, $h$, at its rear end, in which a ring, $i$, is fitted to secure the bar A to the clevis of any implement, or to a vehicle. A whiffle-tree is attached to each hook $d'$ of the bars C, when the bar is used flatwise, as shown in fig. 1, and a whiffle-tree is attached to the eye or loop $d$ of the central bar B.

By referring to fig. 4, it will be seen that the bar B serves as a lever to the centre horse, and places him in the same position, as regards leverage, as the other two horses. The draught, therefore, is equally divided between the three horses, when the bars C are adjusted to bar A at equal distances from its centre.

If it should be necessary to favor either the "off" or "near" horse it may readily be done, by moving the bar C to which the horse not to be favored is attached, more or less inward, so as to decrease his leverage on bar B. The central horse attached to bar B may be treated in a like manner, by shifting the eye or loop $d$ higher or lower on bar B. Taking the eye $h$ of bolt $a$ as a fulcrum, and the distance of the hooks $d'$ or $d''$ from a central line on A, parallel with its sides, and passing through the fulcrum, as equivalent to the distance of said hooks from the fulcrum, it will be seen that, by having the distance from the eye or loop $d$ to the fulcrum just double the distance each hook $d'$ or $d''$ is from the central line on bar A, the draught will be equalized between the three horses.

In order to adjust the bar A edgewise, as exhibited in figs. 2 and 3, the position of bar B is shifted, so as to extend upward from the narrow side or edge $f$, the end whiffle-trees, in this case, being attached to the hooks $d''$.

In converting the device into a two-horse evener, all that is required is to remove the bar B, and adjust the bar A, so that the hooks $d'$ or $d''$ will be uppermost, or at the upper edge of the bar A.

Having thus described my invention, what I claim as new, and desire to secure by Letters Patent, is—

A draught-attachment or evener, composed of a bar, A, provided with bars C, having hooks $d'$ $d''$, either or both, at its ends, in connection with the central bar B, with adjustable eye or loop $d$, attached, all constructed and arranged substantially in the manner as and for the purpose set forth.

W. P. BROOKS.

Witnesses:
 HORACE T. COOK,
 ISAAC W. CHRISTIAN.